3,248,281
IODINE-PEROXIDE-BISULFATE ANTIMICROBIAL
COMPOSITION
Robert D. Goodenough, Midland, Mich., assignor to The
Dow Chemical Company, Midland, Mich., a corporation of Delaware
No Drawing. Filed June 26, 1963, Ser. No. 290,613
16 Claims. (Cl. 167—17)

The invention relates to a new composition of matter and more particularly to a solid granular composition comprising a water-soluble iodide, a peroxide, a water-soluble bisulfate and a suitable water-soluble catalyst, which is stable in the dry state, and upon subsequent intermixture with water, has antimicrobial action.

Elemental halogens, e.g., chlorine, bromine or iodine, have long been added to aqueous solutions to destroy or prevent the growth therein of microorganisms. However, this procedure is often inconvenient and hazardous. Thus, attempts have been made to provide such halogen by addition of a compound which releases a halogen in situ.

It is known to admix a composition containing a soluble iodide, a soluble iodate and a solid acid, e.g., an alkali metal bisulfate or acid phosphate or sulfamic acid, with an aqueous solution of water whereupon iodine is therein released. The iodine so released inhibits the growth of microorganisms in the solution or in contact therewith. Disadvantages associated with such compositions are found in its preparation, handling and storage and in its hygroscopic character which offers serious difficulties in maintaining the compositions in a dry state. Some improvements over such compositions have been attempted among which is the replacement of the iodate, e.g., sodium iodate, by the complex salt, $NaIO_3 \cdot 4Na_2SO_4$ or $NaIO_3 \cdot 3Na_2SO_4$, as described in U.S. Patent 2,918,400. Improved compositions containing such complex salts are limited to only those comprising the iodide and iodate mixtures. The use of a complex iodate as an oxidizer is very expensive in comparison to the cost of a peroxide used for the same purpose. In addition, the complex iodate is required to be crystallized to insure stabilization at atmospheric conditions. This is not a requirement of my invention.

A bromine-releasing formulation comprised of a water-soluble bromide, a soluble bromate and a soluble complex or double salt consisting of a bisulfate and the sulfate is described in U.S. Patent 3,058,875.

This formulation is an effective antimicrobial composition but has several drawbacks associated therewith including slow release of bromine and poor distribution of bromine throughout the solution when dissolved in water.

There is a need for a composition of matter which is safely and readily prepared, is stable upon storage and shipment, is stable at atmospheric conditions but which releases iodine when admixed with water or an aqueous solution to provide antimicrobial action and wherein expensive complex iodates are not needed as a raw material in the making of such a composition.

Thus, it is an object of this invention to meet this need. Other objects and advantages of the present invention will become more apparent hereinafter.

The term "sodium molybdate," used hereinafter, refers to anhydrous and/or hydrated sodium molybdate. The term "sodium chromate," used hereinafter, refers to anhydrous and/or hydrated sodium chromate.

Accordingly, the invention is a composition of matter which is stable under normal conditions of light, heat and moisture and is highly effective as an antimicrobial composition for admixture with an aqueous solution of water, e.g., the water in toilet bowls, in swimming pools, potable water and the like. The composition consists of water-soluble iodide including ammonium iodide, the alkali metal iodides, e.g., potassium iodide (KI), sodium iodide (NaI), lithium iodide (LiI), the alkaline earth iodides, e.g., calcium iodide ($CaI_2$), strontium iodide ($SrI_2$), magnesium iodide ($MgI_2$), barium iodide ($BaI_2$), a peroxide including the alkaline earth peroxides, e.g., calcium peroxide ($CaO_2$), strontium peroxide ($SrO_2$), barium peroxide ($BaO_2$), the alkali metal peroxides, e.g., lithium peroxide ($Li_2O_2$), or zinc peroxide ($ZnO_2$), a water-soluble bisulfate including the alkali metal bisulfates, e.g., sodium bisulfate ($NaHSO_4$), potassium bisulfate ($KHSO_4$), lithium bisulfate ($LiHSO_4$) and a suitable catalyst capable of catalyzing the release of the iodine including water-soluble compounds containing molybdenum, e.g., ammonium molybdate, the alkali metal molybdenum salts comprising sodium molybdate, potassium molybdate, lithium molybdate, water-soluble chromium salts, e.g., ammonium chromate, ammonium bichromate, the alkali metal chromium salts comprising sodium chromate, potassium chromate, lithium chromate and the bichromates. The most common ingredients employed in the preparation of the composition of the invention consists of potassium iodide, calcium peroxide, sodium bisulfate and sodium molybdate. In order to obtain 100 percent conversion of iodide to iodine so as to effect maximum arrest or inhibition of microbial growth, the peroxide and iodide ingredients of the composition are preferably present in mole ratios ranging from 1.5 to 3.0 along with from 0.15 to 0.45 mole of alkali metal molybdate catalyst based on the iodide content and the bisulfate in excess of the stoichiometric quantity set forth in the equation below (i.e., at least four moles of bisulfate to each mole of peroxide):

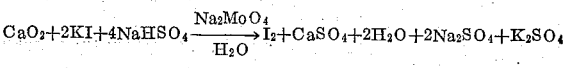

If the same amount of alkali metal chromium salt is substituted for the molybdenum salt, the following reaction occurs:

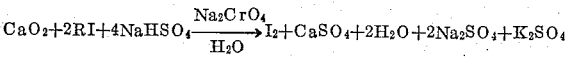

Such compositions, that is, the starting ingredients, are substantially non-hygroscopic under atmospheric conditions. They are readily soluble in aqueous solutions and release iodine therein to arrest microbial growth.

In addition to calcium peroxide which may be used as an oxidizer, equivalent amounts of other alkaline earth peroxides including strontium peroxide, which are stable in their dry state and in a dry mixture with sodium bisulfate, are useful in this invention.

In general, the composition, in its use as a toilet bowl cleaner formulation, for example, should release from 25 to 50 p.p.m. of iodine to give a complete kill of the principal strains of bacteria found in toilet bowls. Assuming that a standard bowl contains three quarts (2833 ml.) of water, about 50 grams of the starting composition will produce about 0.1418 gram of iodine, thus maintaining a final concentration of 50 p.p.m. of iodine in said toilet bowl.

In the practice of the invention, it is recommended that a soluble carbonate, preferably $Na_2CO_3$, whether in its anhydrous form or in one of its hydrated forms, e.g., $Na_2CO_3 \cdot H_2O$ or $Na_2CO_3 \cdot 10H_2O$, be added to the peroxide-iodide-bisulfate catalyst mixture. The carbonate, upon subsequently being admixed with an acidic aqueous solution, releases $CO_2$ with an accompanying effervescence and turbulence which distributes the reactants through the body of aqueous solution, thereby substantially insuring treatment of the entire body of water or liquid being treated.

The invention may be carried out by intermixing, in the dry state, a peroxide, e.g., an alkaline earth peroxide, and a water-soluble iodide, e.g., an alkali metal iodide, in mole ratios ranging from 1.5 to 3.0 and preferably 2.5, a water-soluble bisulfate, e.g., an alkali metal bisulfate in excess of its stoichiometric quantity, and at least from 0.15 to 0.45 mole ratio (preferably 0.30) of a water-soluble salt, e.g., an alkali metal molybdate, based on the iodide content. A dry mixture of $CaO_2$, KI, $NaHSO_4$ and $Na_2MoO_4 \cdot 2H_2O$ is illustrative of the composition of the invention. $Na_2CO_3$ may also be present, if desired, in an amount less than the stoichiometric quantities or less than one mole of sodium carbonate per two moles of sodium bisulfate as required by the following equation so that an acidic solution results having a pH value of 1–2:

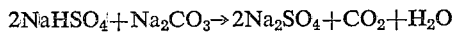

$$2NaHSO_4 + Na_2CO_3 \rightarrow 2Na_2SO_4 + CO_2 + H_2O$$

The following example illustrates the release of elemental iodine when the ingredients of the compositions are admixed in the presence of water.

0.0654 gram of KI was dry mixed with 15.68 grams of $NaHSO_4$ and 1.76 grams of $Na_2CO_3$. To this basic formulation were added 0.12 gram of $CaO_2$ (71 percent active) and 0.025 gram of $Na_2MoO_4 \cdot 2H_2O$ and the whole dissolved in 1 liter of $H_2O$. $I_2$ was thus liberated. The iodide was found to be converted entirely into $I_2$. The $H_2O$ was found to contain 53 p.p.m. of $I_2$.

The aforesaid procedure was repeated; however there was no $Na_2MoO_4 \cdot 2H_2O$ added as a catalyst. Only 2 percent of the iodide was converted to $I_2$ by this method.

The aforesaid procedure was repeated; however, the sodium molybdate was replaced by 0.025 gram of sodium chromate and only 0.02 gram of calcium peroxide was used. Twenty-six percent iodide initially present was found to be converted into $I_2$.

To show the antimicrobial effect of the composition of the invention, 1 liter of $H_2O$, infested at about room temperature (20° C.) with the following microorganisms commonly found in toilet bowls: *Pseudomonas aeruginosa, Aerobacter aerogenes, Escherichia coli* and *Staphylococcus aureus*, was admixed with 17.6 grams of a mixture consisting of 89.1 percent by weight $NaHSO_4$, 10 percent by weight $Na_2CO_3$, 0.19 percent by weight KI, 0.58 percent by weight $CaO_2$ and 0.15 percent by weight $Na_2MoO_4 \cdot 2H_2O$. Thereafter, a culture was taken on the treated water. The microorganisms therein were found to have been completely inhibited from further growth within 3 minutes.

For comparison purposes, the aforesaid formulation, without any iodide added thereto, was dissolved in 1 liter of water containing the aforesaid microorganisms and the test repeated. At the end of 5 minutes, the growth of the microorganisms had not been completely inhibited.

Thus, it is seen that the composition of matter of the instant invention is highly effective in destroying microorganisms found in toilet bowls.

Various modifications can be made in the method of the present invention without departing from the spirit or scope thereof, for it is understood that I limit myself only as defined in the appended claims.

What is claimed is:

1. An antimicrobial composition for admixture with water consisting essentially of a member selected from the class consisting of zinc, alkaline earth, and alkali metal peroxides which are stable both in the dry state and in a dry mixture with sodium bisulfate, a water soluble iodide in a mole ratio of about 1.5 to about 3.0 based on the peroxide, a water soluble alkali metal bisulfate in a mole ratio of at least 4 moles based on said iodide and at least 0.15 mole based on said iodide of a water soluble salt selected from the class consisting of ammonium molybdate, the alkali metal molybdates, ammonium chromate and bichromate and the alkali metal chromates and bichromates.

2. An antimicrobial composition consisting essentially of an alkaline earth peroxide and an alkali metal iodide in mole ratios ranging from 1.5 to 3.0, at least 4 moles of an alkali metal bisulfate based on said peroxide and at least 0.15 moles based on said iodide of a water-soluble salt selected from the group consisting of ammonium molybdate, the alkali metal molybdates, ammonium chromate and bichromate and the alkali metal chromates and bichromates.

3. An antimicrobial composition for the release of iodine in aqueous solutions when admixed therewith consisting essentially of calcium peroxide and potassium iodide in mole ratios ranging from 1.5 to 3.0, from 0.15 to 0.45 mole ratio sodium molybdate based on potassium iodide content and at least 4 moles of sodium bisulfate to each mole of calcium peroxide.

4. A composition of matter in accordance with claim 3 wherein sodium carbonate in an amount of less than 1 mole per 2 moles of sodium bisulfate is added thereto so that the resultant solution has a pH value of from 1 to 2.

5. A composition of matter in accordance with claim 3 wherein calcium peroxide is substituted by strontium peroxide.

6. A composition of matter in accordance with claim 3 wherein the sodium molybdate is substituted by sodium chromate.

7. A composition of matter in accordance with claim 6 wherein sodium carbonate in an amount less than 1 mole per 2 moles of sodium bisulfate is added thereto, so that the resultant solution has a pH value of from 1 to 2.

8. A composition of matter in accordance with claim 6 wherein calcium peroxide is substituted by strontium peroxide.

9. The method of arresting microbial growth in an aqueous solution which comprises admixing with said solution an antimicrobial composition consisting essentially of a member selected from the class consisting of zinc, alkaline earth and alkali metal peroxides which are solid and stable both in the dry state and in a dry mixture with sodium bisulfate, in a mole ratio of 1.5 to 3 based on said peroxide, a water soluble iodide, a water soluble alkali metal bisulfate in a mole ratio of at least 4 based on the said iodide and at least .15 mole based on said iodide of a water soluble salt selected from the group consisting of ammonium molybdate, the alkali metal molybdates, ammonium chromate and bichromate and the alkali metal chromates and bichromates.

10. The method of arresting microbial growth in an aqueous solution which comprises admixing with said solution an antimicrobial composition consisting essentially of an alkaline earth peroxide and an alkali metal iodide in mole ratios ranging from 1.5 to 3.0, at least 4 moles of an alkali metal bisulfate based on said peroxide and at least 0.15 mole based on the said iodide of a water-soluble salt selected from the group consisting of ammonium molybdate, the alkali metal molybdates, ammonium chromate and bichromate and the alkali metal chromates and bichromates.

11. The method of cleansing a vessel and arresting microbial growth in an aqueous solution contained in said vessel which comprises admixing with said solution an antimicrobial composition consisting essentially of calcium peroxide and potassium iodide in mole ratios ranging from 1.5 to 3.0, from 0.15 to 0.45 mole ratio sodium molybdate based on potassium iodide content and at least 4 moles of sodium bisulfate to each mole of calcium peroxide.

12. The method in accordance with claim 11 wherein sodium carbonate in an amount of less than 1 mole per 2 moles of sodium bisulfate is added thereto and the resultant solution has a pH value of from 1 to 2.

13. The method in accordance with claim 11 wherein calcium peroxide is substituted by strontium peroxide.

14. The method in accordance with claim 11 wherein the sodium molybdate is substituted by sodium chromate.

15. The method in accordance with claim 14 wherein sodium carbonate in an amount of less than 1 mole per 2 moles of sodium bisulfate is added thereto, so that the resultant solution has a pH value of from 1 to 2.

16. The method in accordance with claim 14 wherein calcium peroxide is substituted by strontium peroxide.

References Cited by the Examiner

UNITED STATES PATENTS

| | | | |
|---|---|---|---|
| 989,322 | 11/1811 | Bernheimer | 167—17 |
| 2,585,965 | 2/1952 | Salle | 167—70 |
| 2,854,377 | 9/1958 | Elias | 167—30 |
| 2,918,400 | 12/1959 | Loonam | 167—17 |

OTHER REFERENCES

Anon: "Chemical Abstracts," 49, (1955).

Merck Index, Merck and Co., Inc., Rahway, New Jersey, 1960, pp. 197 and 535.

Reddish: "Antiseptics, Disinfectants, Fungicides and Sterilization," Lea and Febiger, Philadelphia, Pennsylvania, 1954, p. 521.

JULIAN S. LEVITT, *Primary Examiner.*

STANLEY J. FRIEDMAN, *Assistant Examiner.*